(12) United States Patent
Skinner et al.

(10) Patent No.: US 10,766,609 B2
(45) Date of Patent: Sep. 8, 2020

(54) TORQUE BAR RETENTION FOR WHEEL ASSEMBLIES

(71) Applicant: GOODRICH CORPORATION, Charlotte, NC (US)

(72) Inventors: Brian D. Skinner, Troy, OH (US); Tricia Botkin, Springboro, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 273 days.

(21) Appl. No.: 16/022,296

(22) Filed: Jun. 28, 2018

(65) Prior Publication Data
US 2020/0001985 A1    Jan. 2, 2020

(51) Int. Cl.
*B64C 25/42* (2006.01)
*F16D 65/12* (2006.01)
*F16D 65/02* (2006.01)

(52) U.S. Cl.
CPC .............. *B64C 25/42* (2013.01); *F16D 65/12* (2013.01); *B60B 2320/10* (2013.01); *B60B 2900/212* (2013.01); *B60B 2900/541* (2013.01); *F16D 2065/138* (2013.01); *F16D 2065/1392* (2013.01)

(58) Field of Classification Search
CPC .................................. B64C 25/42; F16D 65/12
USPC ..................................... 301/6.1, 6.2; 188/71.5
See application file for complete search history.

(56) References Cited

U.S. PATENT DOCUMENTS

| | | | |
|---|---|---|---|
| 2,990,216 A | 6/1961 | Albert et al. | |
| 3,958,833 A * | 5/1976 | Stanton | F16D 55/40 301/6.2 |
| 4,585,096 A * | 4/1986 | Bok | F16D 13/648 188/71.5 |
| 5,107,569 A | 4/1992 | Hughes | |
| 5,199,536 A * | 4/1993 | Clark | F16D 55/36 188/264 G |
| 5,401,079 A * | 3/1995 | Rooney | B60B 5/02 301/6.91 |
| 5,540,305 A | 7/1996 | Hammond et al. | |
| 5,579,861 A | 12/1996 | Ballester | |
| 5,851,056 A * | 12/1998 | Hyde | B60B 19/10 301/6.91 |
| 7,255,208 B2 * | 8/2007 | Rea | F16D 65/847 188/264 G |

(Continued)

FOREIGN PATENT DOCUMENTS

EP        0555822        8/1993

OTHER PUBLICATIONS

European Patent Office, European Search Report dated Nov. 20, 2019 in Application No. 19183408.4.

*Primary Examiner* — Kip T Kotter
(74) *Attorney, Agent, or Firm* — Snell & Wilmer L.L.P.

(57) ABSTRACT

A wheel assembly includes a wheel portion comprises a web having an inboard surface. The web may define a torque bar retention slot that extends from the inboard surface of the web. The wheel assembly may also include a bushing disposed in the torque bar retention slot, wherein the bushing comprises an open end and a closed end. Still further, the wheel assembly may include a torque bar coupled to the wheel, and the torque bar may include a boss extending into the bushing through the open end of the bushing such that the boss of the torque bar is at least partially disposed within the torque bar retention slot of the wheel portion.

9 Claims, 6 Drawing Sheets

(56) References Cited

U.S. PATENT DOCUMENTS

| | | | |
|---|---|---|---|
| 8,157,062 B2* | 4/2012 | Enright | F16D 55/36 |
| | | | 188/71.5 |
| 2006/0171775 A1 | 8/2006 | McLaughlin et al. | |
| 2007/0246995 A1* | 10/2007 | Scelsi | B64C 25/36 |
| | | | 301/6.1 |
| 2013/0015697 A1* | 1/2013 | Hall | B64C 25/36 |
| | | | 301/6.91 |
| 2015/0075897 A1 | 3/2015 | Copeland | |
| 2017/0363162 A1* | 12/2017 | Whittle | F16D 65/128 |

* cited by examiner

TORQUE BAR RETENTION FOR WHEEL ASSEMBLIES

FIELD

The present disclosure relates to wheel assemblies, and more specifically, to retaining torque bars of wheel assemblies.

BACKGROUND

Aircraft typically include landing gear for supporting the aircraft above a ground surface and for allowing the aircraft to move relative to the ground surface while remaining supported by the ground surface. The landing gear may include one or more wheel assemblies. The wheel assemblies may be split wheel assemblies, for example, and may have an inboard wheel portion and an outboard wheel portion. Conventional mounting configurations for torque bars, to which rotors of the brake assembly may be coupled, have various shortcomings. For example, environmental contaminants, such as water, debris, chemical compounds, etc., may move through torque bar mounting slots, and the ingress of such contaminants often detrimentally facilitates corrosion of the wheel assembly. This corrosion and other damage may occur at the joining interface between corresponding wheel portions of a split wheel assembly, which can lead to a high scrap rate and/or high repair costs.

SUMMARY

In various embodiments, the present disclosure provides a wheel assembly that includes a wheel portion comprising a web having an inboard surface. The web may define a torque bar retention slot that extends from the inboard surface of the web. The wheel assembly may also include a bushing disposed in the torque bar retention slot, wherein the bushing comprises an open end and a closed end. Still further, the wheel assembly may include a torque bar coupled to the wheel, and the torque bar may include a boss extending into the bushing through the open end of the bushing such that the boss of the torque bar is at least partially disposed within the torque bar retention slot of the wheel portion.

In various embodiments, the wheel assembly is a split wheel assembly, such that the wheel portion is an inboard wheel portion and the wheel assembly further comprises an outboard wheel portion. Accordingly, the web may be an inboard web that comprises a first mating surface. The outboard wheel portion may comprise an outboard web that has a second mating surface. The first mating surface and the second mating surface are disposed adjacent each other and form a joining interface between the inboard wheel portion and the outboard wheel portion, according to various embodiments.

The torque bar retention slot may be a pass-through hole that extends from the inboard surface of the inboard web to the first mating surface. The wheel assembly may also include a plurality of bolts extending through the inboard web and the outboard web to retain together the inboard wheel portion and the outboard wheel portion, wherein the torque bar retention slot is substantially parallel to the plurality of bolts. In various embodiments, the open end of the bushing has a flange that engages the inboard surface of the inboard web of the inboard wheel portion. In various embodiments, the closed end of the bushing is tapered. In various embodiments, the bushing has an interference fit within the torque bar retention slot and the boss of the torque bar is loosely fit within the bushing.

Also disclosed herein, according to various embodiments, is a method of assembling a wheel assembly. The method may include inserting a bushing into a torque bar retention slot of a web of a wheel portion, wherein the bushing comprises a closed end and an open end. The method may also include inserting a boss of a torque bar into the bushing through the open end.

In various embodiments, inserting the boss of the torque bar into the bushing is performed after inserting the bushing into the torque bar retention slot. The method may also include coupling the torque bar to an inboard flange of the wheel portion. Coupling the torque bar to the inboard flange of the wheel portion may be performed after inserting the boss of the torque bar into the bushing. In various embodiments, inserting the bushing into the torque bar retention slot includes an interference fit between the bushing and the torque bar retention slot. In various embodiments, inserting the boss of the torque bar into the bushing comprises a loose fit between the boss and the bushing.

In various embodiments, the method is a process for at least one of inspecting, cleaning, and repairing the wheel assembly. That is, the assembly method may actually be a method of inspecting, cleaning, and/or repairing the wheel assembly. In various embodiments, the method further includes cleaning the torque bar retention slot before inserting the bushing into the torque bar retention slot. In various embodiments, the method further includes removing the bushing from the torque bar retention slot before cleaning the torque bar retention slot. In various embodiments, the wheel assembly is a split wheel assembly and the torque bar retention slot is a pass-through hole that extends from an inboard surface of the web to a mating surface of the web, wherein removing the bushing from the torque bar retention slot comprises pushing the bushing through the torque bar retention slot from the mating surface of the web.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component.

Figure 1:
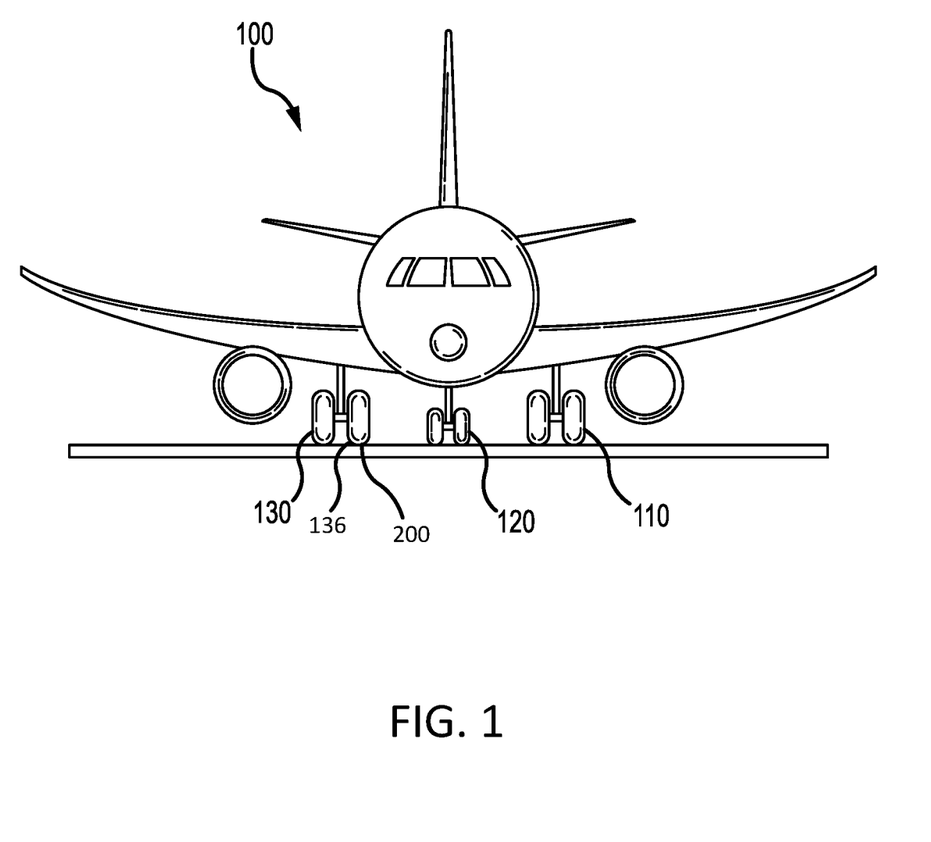
FIG. 1 illustrates an aircraft having multiple landing gear, in accordance with various embodiments.
Figure 3:
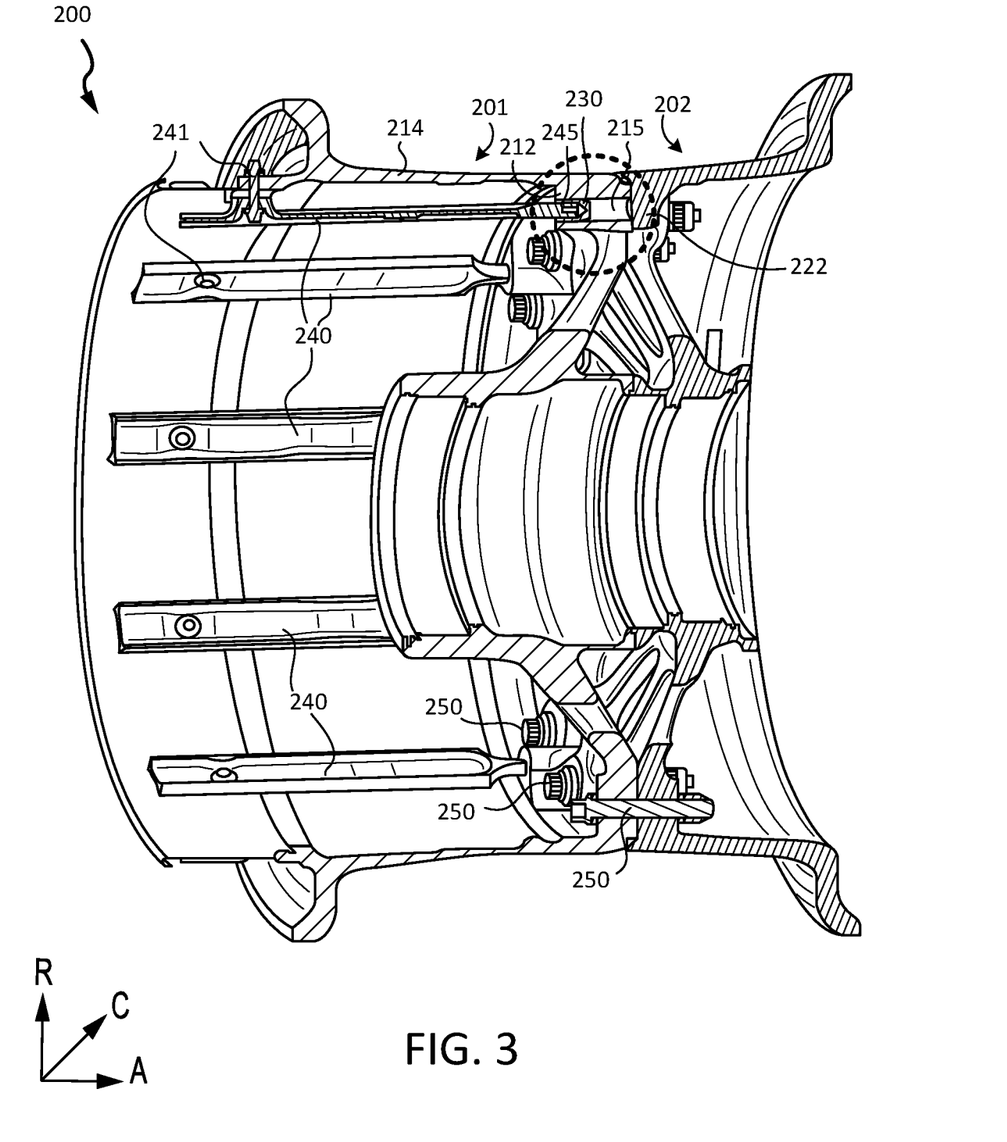
FIG. 3 is a perspective cross-sectional side view of a wheel assembly, in accordance with various embodiments.

With reference to FIG. 1, an aircraft 100 in accordance with various embodiments can include multiple landing gear including a first landing gear 110, a second landing gear 120 and a third landing gear 130. Each landing gear may include one or more wheel assemblies 200 (FIG. 3). For example, the third landing gear 130 may include a inner/inboard wheel assembly and an outer/outboard wheel assembly. Each wheel assembly of the aircraft 100 may be designed to receive a tire. For example, a tire 136 may be placed about an outer circumference of wheel assembly 200 and inflated.

Figure 2:
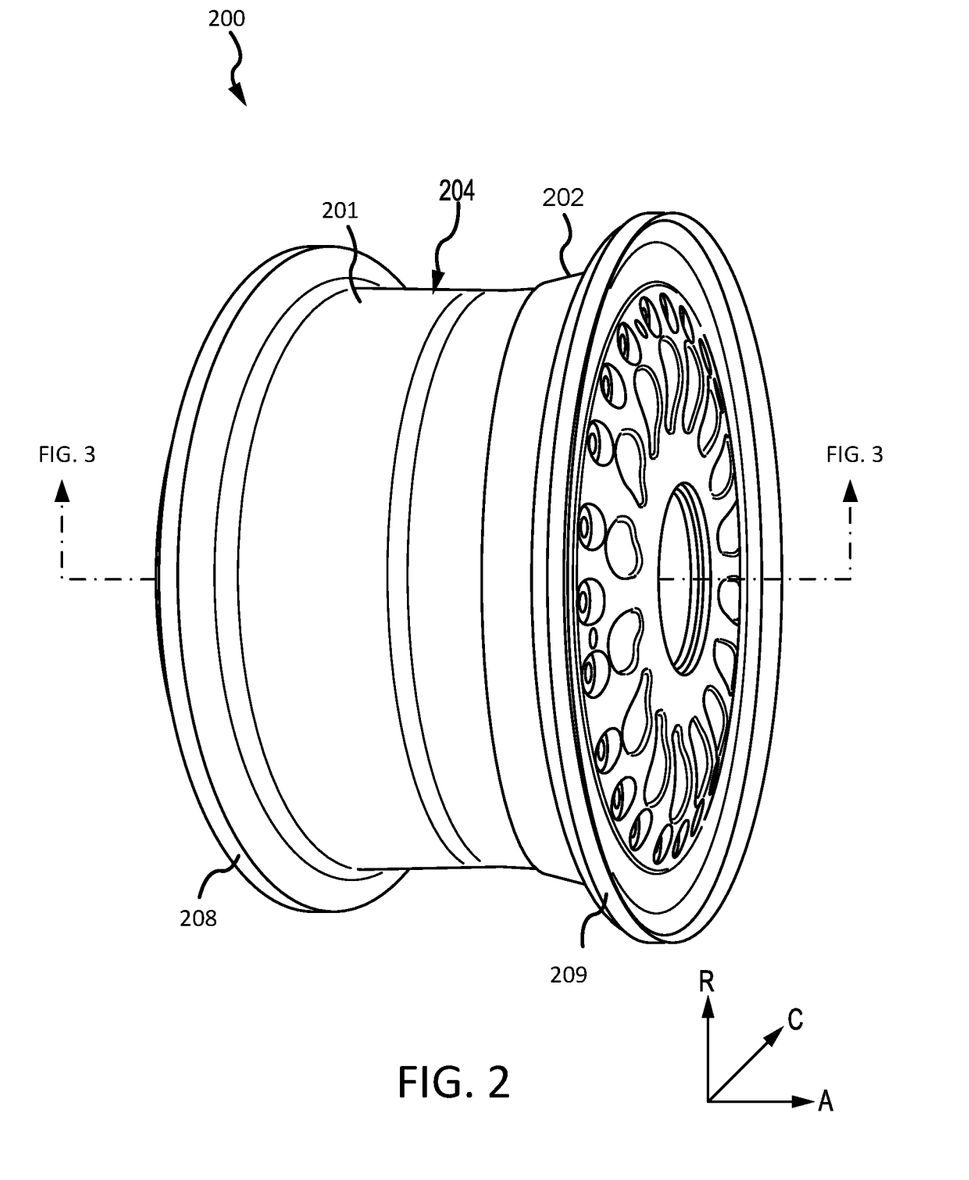
FIG. 2 illustrates a wheel assembly, in accordance with various embodiments.

Turning to FIG. 2, wheel assembly 200 includes an inboard wheel portion 201 and an outboard wheel portion 202, according to various embodiments. That is, wheel assembly 200 may be a split wheel assembly, as described in greater detail below, and thus the wheel portions 201, 202 may be referred to as wheel halves (e.g., inboard wheel portion 201 may be referred to as an inboard wheel half and outboard wheel portion may be referred to as outboard wheel half). The wheel assembly 200 may be implemented with any landing gear of the aircraft 100 (e.g., any of the three landing gears mentioned above), and the wheel assembly 200 may be an inner/inboard wheel assembly or an outer/outboard assembly. Although numerous details are included herein pertaining to the implementation of the wheel assembly 200 in an aircraft, one skilled in the art will realize that a similar wheel assembly may be used in other vehicles, such as cars or motorcycles, and thus the scope of the present disclosure is not necessarily limited to aircraft wheel assemblies.

In various embodiments, wheel assembly 200 also defines a tube-well 204. Tube-well 204 may be defined by respective flange sections of the inboard wheel portion 201 and the outboard wheel portion 202. Tube-well 204 may be configured to receive a tire and may form a seal with tire to allow pressurized air to inflate the tire. In various embodiments, the inboard wheel portion 201 also includes a radially outward extending lip or rim 208 located at an inboard end of inboard wheel portion 201, and the outboard wheel portion 202 may also include a similar radially outward extending lip or rim 209 located at an outboard end of the outboard wheel portion 202.

Figure 4:
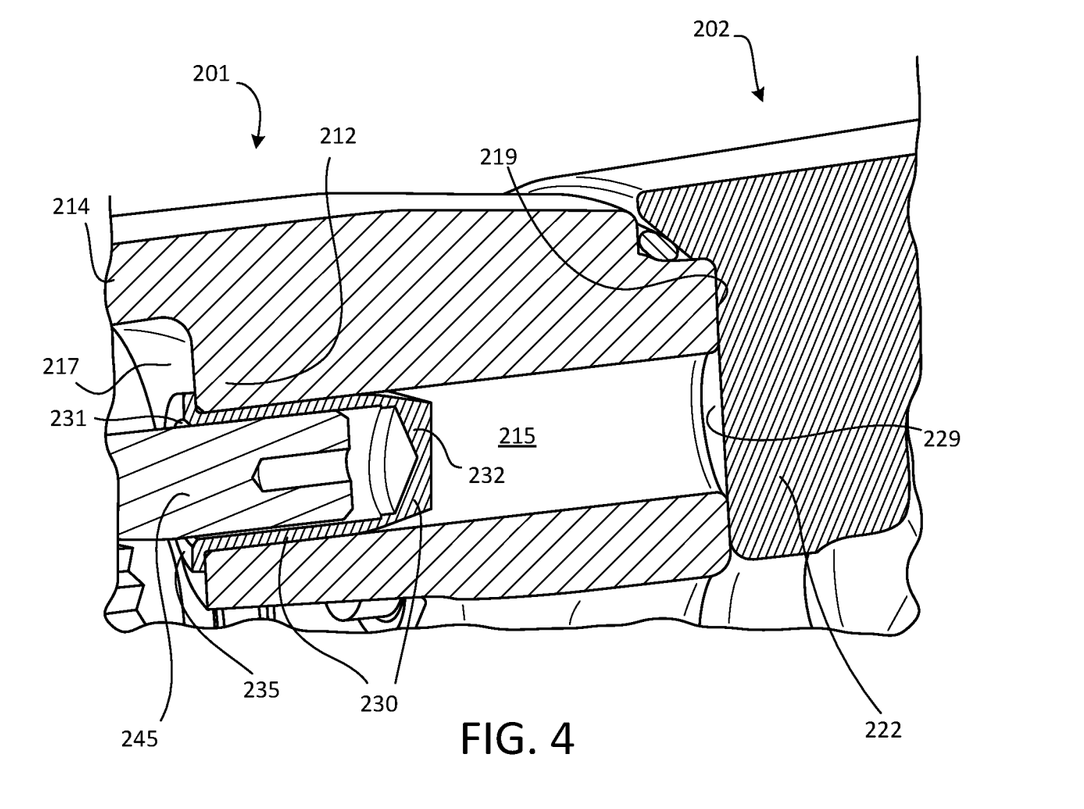
FIG. 4 is a perspective cross-sectional side view of a portion of the wheel assembly of FIG. 3, in accordance with various embodiments.

In various embodiments, and with reference to FIGS. 3 and 4, the inboard wheel portion 201 of the wheel assembly 200 has an inboard web 212 with a torque bar retention slot 215 defined in the inboard web 212. The torque bar retention slot(s) 215 may be oriented to be substantially parallel with the plurality of bolts 250 holding the two portions 201, 202 of the wheel assembly 200 together, and may thus extend axially. An A-R-C axis has been included in FIG. 3 to illustrate the axial (A), radial (R) and circumferential (C) directions. The torque bar retention slot 215, according to various embodiments, is a hole within which a boss 245 of a torque bar 240 can be retained. That is, the wheel assembly 200 includes one or more torque bars 240 that are coupled to the inboard wheel portion 201 (e.g., coupled to a flange section 214 of the inboard wheel portion 201), and an outboard end of each torque bar 240 is disposed and at least partially retained within a respective torque bar retention slot 215 defined in the inboard web 212 of the inboard wheel portion 201, according to various embodiments. The torque bars 240 may be distributed circumferentially around a radially inward surface of inboard wheel portion 201. For example, one or more fasteners 241 (FIG. 3) may be utilized to anchor inboard portions of each torque bar 240 to flange section 214, while the torque bar retention slot 215 anchors and retains the torque bar 240 to the inboard web 212 of the inboard wheel portion 201. One or more rotor disks of a multi-disk brake stack may be coupled to the torque bar(s) 240, and compression of the rotor disks and the stator disks of the brake stack results in a braking force applied to the wheel. The outboard wheel portion 202 of wheel assembly 200 further includes outboard web 222.

With continued reference to FIGS. 3 and 4, the wheel assembly 200 may include a bushing 230 disposed in the torque bar retention slot 215, and the boss 245 of the torque bar 240 may be disposed within the bushing 230. That is, the bushing 230 may be disposed so as to surround the boss 245 and to function as an interface between the boss 245 and the torque bar retention slot 215. In various embodiments, the bushing 230 may be press fit (e.g., interference fit, friction fit) into the torque bar retention slot 215. Additionally, the bushing 230 may have an open end 231 and a closed end 232.

With a closed-ended bushing 230 press fit within the torque bar retention slot 215, the outboard portion of the torque bar retention slot 215 (FIG. 4) is substantially isolated from the wheel/brake environment. Accordingly, contaminants such as water, debris, compounds, etc., are prevented from ingress into the torque bar retention slot 215. In various embodiments, the torque bar retention slot 215 is a pass-through hole that extends from the inboard surface 217 of the inboard web 212 of the inboard wheel portion 201 entirely through the inboard web 212 to a first mating surface 219 of the inboard web 212. Ingress prevention may be especially important in split wheel assemblies with a pass-through torque bar retention slot 215, such as the wheel assembly 200 shown in FIGS. 2, 3, and 4, because contaminants are prevented from passing through the torque bar retention slot 215 and are thus prevented from arriving at the joining interface between corresponding mating surfaces of the two wheel portions. More specifically, the inboard wheel portion 201 comprises a first mating surface 219, opposite the inboard surface 217, and the outboard wheel portion 202 comprises a second mating surface 229, and these mating surfaces 219, 229 are disposed adjacent each other and form a joining interface between the inboard wheel portion 201 and the outboard wheel portion 202. Because the bushing 230 fits tightly within the torque bar retention slot 215, and because the bushing 230 has a closed end 232, moisture and other contaminants are prevented from arriving at the joining interface of the split wheel assembly, and thus corrosion is prevented.

In various embodiments, because of the aforementioned seal formed by the press fit of the closed-ended bushing 230 within the torque bar retention slot 215, the fit between the boss 245 of the torque bar 240 and the bushing 230 may be comparatively looser (e.g., may not provide a fluid seal there-between and/or may allow for installation tolerances). That is, the fit between the boss 245 of the torque bar 240 and the bushing 230 may be at least allow a degree of relative movement, thereby facilitating installation/assembly of the torque bar 240. For example, the process of mounting and/or otherwise attaching the torque bar 240 to the inboard wheel portion 201 may be easier because of the comparatively looser fit between the boss 245 and the bushing 230.

Figure 5A:
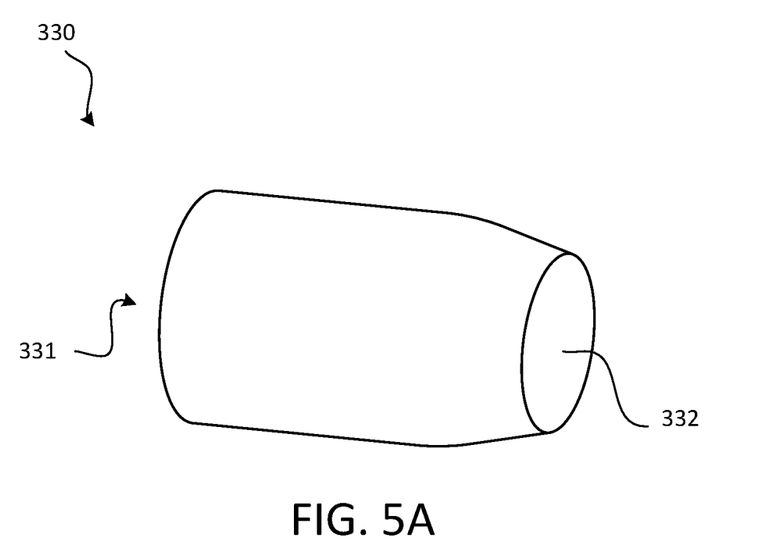
FIG. 5A is a perspective view of a bushing of a wheel assembly, in accordance with various embodiments.
Figure 5B:
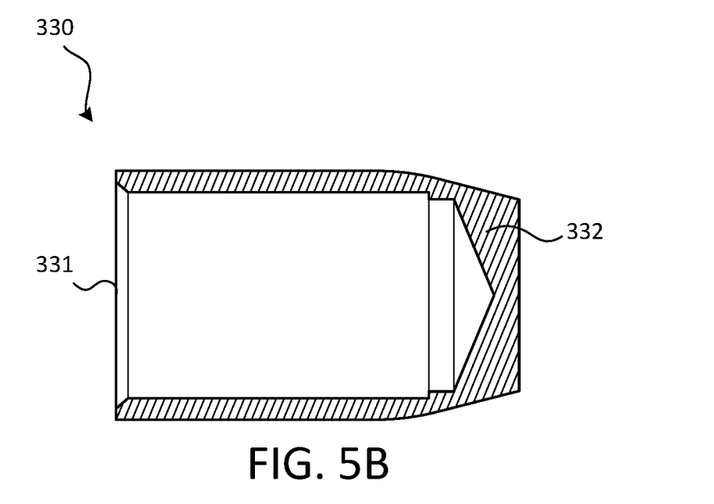
FIG. 5B is a cross-sectional side view of a bushing of a wheel assembly, in accordance with various embodiments.

In various embodiments, and with reference to FIG. 4, the open end 231 of the bushing 230 may have a flange 235 that engages the inboard surface 217 of the inboard web 212 of the inboard wheel portion 201. The flange 235 may seat against the inboard surface 217, and may further facilitate the substantial seal provided by the closed-ended bushing 230. In various embodiments, and with reference to FIGS. 5A and 5B, the bushing 330, with its open end 331 and its closed end 332, may have a tapered shape. That is, the closed end 332 of the bushing 330 may have a tapered, converging, and/or frustoconical shape that helps to dissipate mechanical stresses. The inner surfaces of the closed end 332, the outer surfaces of the closed end 332, or both the inner and outer surfaces of the closed end 332 may have this tapering, converging shape.

In various embodiments, and with renewed reference to FIGS. 3 and 4, the two portions/halves 201, 202 of the wheel assembly 200 may be mechanically secured together using a plurality of bolts 250 that extend through both webs of the wheel portions 201, 202 to retain the two portions 201, 202 together at the joining interface of the first and second mating surfaces 219, 229, respectively. As mentioned below, during an inspection, cleaning, or repair procedure, the bolts 250 may be loosened and the inboard wheel portion 201 may be separated from the outboard wheel portion 202. With the halves of the split wheel assembly separated, the torque bar retention slot 215 may be accessed from the opposite side (e.g., from the first mating surface 219), and the bushing 230 may be pushed/ejected out the torque bar retention slot 215 to allow for inspection, cleaning, and other maintenance of the wheel assembly 200.

In various embodiments, the bushing 230 may be made from a material that is substantially similar to the inboard wheel portion 201 of the wheel assembly 200. For example, the inboard wheel portion 201 may be made from a 2000 series aluminum material, and the bushing 230 may be made from a similar material, such as 2014-T6 aluminum. With the bushing 230 made from the same or at least a similar material as the inboard wheel portion 201, galvanic activity between the two is reduced, thereby further preventing corrosion damage to the wheel assembly 200. Additionally, the bushing may have a conversion coating applied thereon.

Figure 6A:
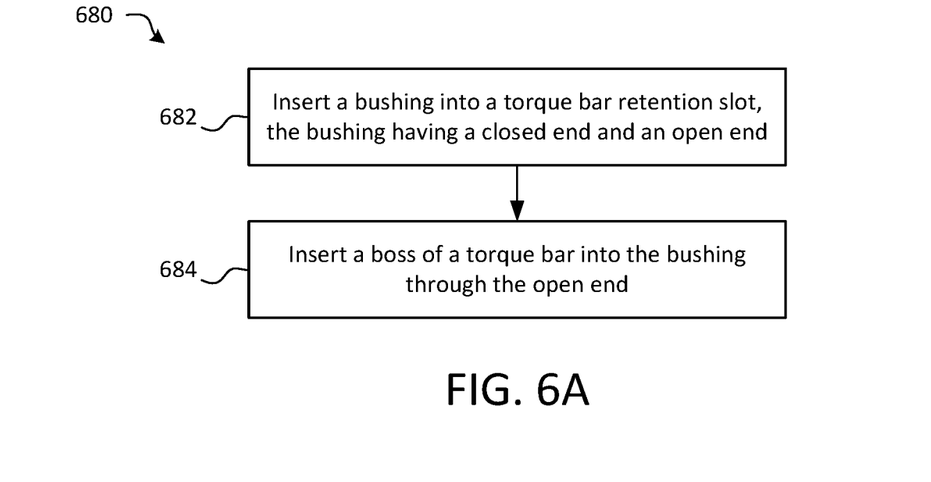
FIG. 6A is a schematic flow chart diagram of a method of assembling a wheel assembly, in accordance with various embodiments.

In various embodiments, and with reference to FIG. 6A, a method 680 of assembling a wheel assembly is provided. The method 680 may include inserting a bushing into a torque bar retention slot, with the bushing having a closed end and an open end at step 682. The method 680 may further include inserting a boss of a torque bar into the bushing through open end at step 684. In various embodiments, step 684 is performed after step 682, thus allowing the bushing to be properly engaged and seated within the torque bar retention slot before inserting the boss of the torque bar into the bushing. Step 682 may include an interference fit between the bushing and the torque bar retention slot, and step 684 may include a comparatively loose fit between the boss and the bushing. In various embodiments, the method 680 also includes coupling the torque bar to a flange (e.g., a flange section) of the inboard wheel portion. For example, the boss of the torque bar may be inserted into the installed bushing at step 684, and then the opposing end of the torque bar, the inboard portion, may be mounted to the flange of the inboard wheel portion using one or more fasteners to complete the installation/mounting of the torque bar(s). In various embodiments, the wheel assembly may be cleaned with the bushing remaining in place within the torque bar retention slot. For example, in a split wheel assembly, the outboard wheel portion may be disconnected from the inboard wheel portion to allow access to the outboard opening of the torque bar retention slot.

Figure 6B:
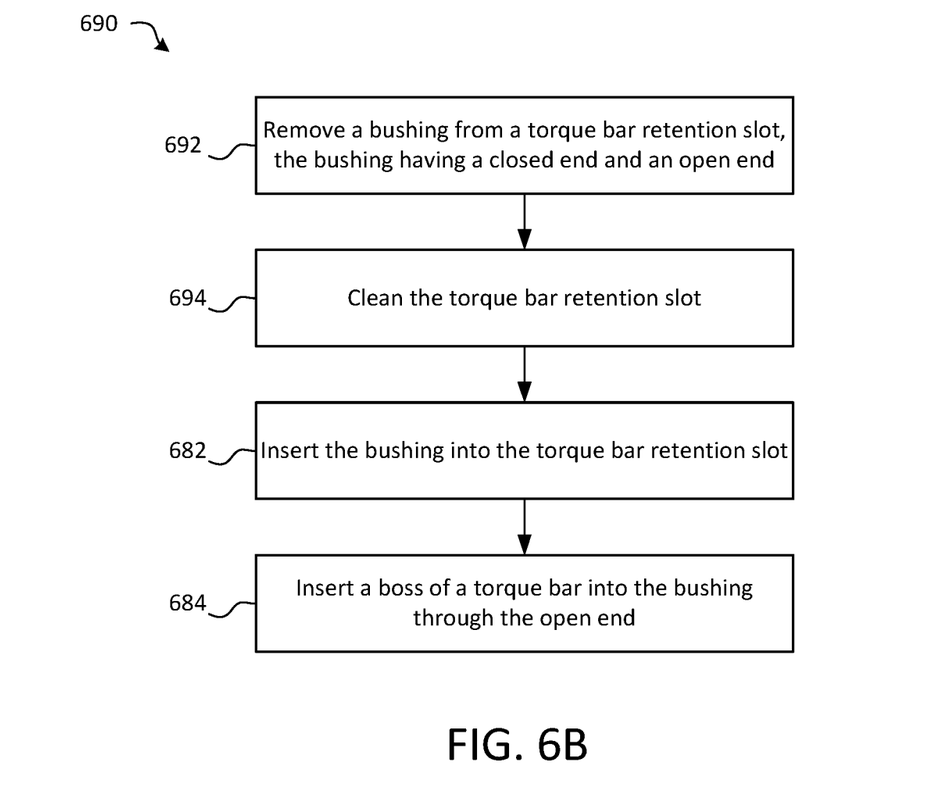
FIG. 6B is a schematic flow chart diagram of a method of repairing and/or cleaning a wheel assembly, in accordance with various embodiments.

In various embodiments, and with reference to FIG. 6B, a method 690 of repairing and/or cleaning a wheel assembly is provided. The method 690 may include removing a bushing from a torque bar retention slot, with the bushing having a closed end and an open end, at step 692. The method 690 may also include cleaning the torque bar retention slot. That is, step 694 may be performed after step 692. Although the closed-ended bushing may inhibit much of the aforementioned contaminant ingress into the torque bar retention slot, this cleaning step 694 may remove any trace amounts of contaminants that may have passed between the bushing and the torque bar retention slot. Inspection/repair method 690 may further include steps 682 and 684, as described above. These steps may be performed after steps 692 and 694.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A wheel assembly comprising:
   an inboard wheel portion comprising a web having an inboard surface and a first mating surface, wherein a torque bar retention slot is defined in the web and extends completely through the web from the inboard surface to the first mating surface;
   an outboard wheel portion comprising an outboard web having a second mating surface, wherein the first mating surface and the second mating surface are disposed adjacent each other and form a joining interface between the inboard wheel portion and the outboard wheel portion;
   a bushing disposed in the torque bar retention slot, wherein the bushing comprises an open end and a closed end; and
   a torque bar coupled to the wheel portion, the torque bar comprising a boss extending into the bushing through the open end of the bushing such that the boss of the torque bar is at least partially disposed within the torque bar retention slot of the wheel portion.

2. The wheel assembly of claim 1, further comprising a plurality of bolts extending through the inboard web and the outboard web to retain together the inboard wheel portion and the outboard wheel portion, wherein the torque bar retention slot is substantially parallel to the plurality of bolts.

3. The wheel assembly of claim 1, wherein the open end of the bushing comprises a flange that engages the inboard surface of the web of the wheel portion.

4. The wheel assembly of claim 1, wherein the closed end of the bushing is tapered.

5. The wheel assembly of claim 1, wherein the bushing has an interference fit within the torque bar retention slot and the boss of the torque bar is loosely fit within the bushing.

6. A method of assembling a wheel assembly, the method comprising:
   inserting a bushing into a torque bar retention slot of a web of a wheel portion, wherein the torque bar retention slot is a pass-through hole that extends completely through the web of the wheel portion, wherein the bushing comprises a closed end and an open end; and
   inserting a boss of a torque bar into the bushing through the open end.

7. The method of claim 6, wherein inserting the boss of the torque bar into the bushing is performed after inserting the bushing into the torque bar retention slot.

8. The method of claim 6, further comprising coupling the torque bar to an inboard flange of the wheel portion.

9. The method of claim 8, wherein coupling the torque bar to the inboard flange of the wheel portion is performed after inserting the boss of the torque bar into the bushing.

* * * * *